United States Patent

[11] 3,615,358

| [72] | Inventors | Marcel Delassus<br>Mazingarbe;<br>Christian Vaniscotte, Vermelles, both of France |
|------|-----------|---|
| [21] | Appl. No. | 852,117 |
| [22] | Filed | Aug. 21, 1969 |
| [45] | Patented | Oct. 26, 1971 |
| [73] | Assignee | Houilleres du Bassin du Nord & du Pas-de-Calais<br>Douai (Nord), France |
| [32] | Priorities | Jan. 7, 1966 |
| [33] | | France |
| [31] | | 45,243;<br>Jan. 7, 1966, France, No. 45,244<br>Continuation-in-part of application Ser. No. 603,110, Dec. 20, 1966, abandoned. |

[54] PROCESS FOR THE PREPARATION OF POTASSIUM METAL
3 Claims, No Drawings

| [52] | U.S. Cl. | 75/66,<br>75/62 |
|------|----------|---|
| [51] | Int. Cl. | C22b 27/00 |
| [50] | Field of Search | 75/66, 62 |

[56] References Cited
UNITED STATES PATENTS

| 1,265,360 | 5/1918 | Morrison | 75/10 |
| 2,424,512 | 7/1947 | Stauffer | 75/66 |

*Primary Examiner*—L. Dewayne Rutledge
*Assistant Examiner*—J. Davis
*Attorney*—Arnold Robinson ABSTRACT: Metallic potassium is prepared from potassium hydroxide or potassium carbonate by reduction with silicon at 1100° to 1200° C. under an inert atmosphere, the potassium hydroxide or potassium carbonate and silicon being in the form of a finely divided mixture with silica and lime in amounts sufficient to convert the potassium hydroxide or carbonate into a silicate and for conversion of all of the silica into calcium silicate, respectively.

PROCESS FOR THE PREPARATION OF POTASSIUM METAL

The present invention relates to the preparation of potassium. This is a continuation-in-part of Ser. No. 603,110, filed Dec. 20, 1966, now abandoned.

It is known that potassium can be obtained in a thermochemical way by different methods:

a. by reduction of potassium fluoride with calcium carbide at between 1000° to 1200° C.: $2KF + CaC_2 = 2K + CaF_2 + 2C$ the yield of potassium being of the order of 80 percent;

b. by reduction of KF by silicon between 1000° to 1200°C. in the presence of lime for the purpose of fixing the fluorine and free silicon:

$$4KF + Si + 4CaO = 4K + 2CaF_2 + [SiO_2, 2CaO]$$

the yield reaching 90 percent; a portion of the KF may be replaced by potassium silicate, which is less expensive, and in this case it can be assumed that two reactions take place simultaneously at between 1000° and 1200° C.:

$$4KF + Si + 4CaO = 4K + 2CaF_2 + [SiO_2, 2CaO]$$
$$2K_2SiO_3 + Si + 6CaO = 4K + 3[SiO_2, 2CaO]$$

c. by reduction of potassium carbonate with silicon in the presence of lime at between 1000° and 1200° C. with a relatively high yield:

$$2K_2CO_3 + 3Si + 6CaO = 4K + 2C + 3[SiO_2, 2CaO]$$

Nevertheless, the preparation of potassium from potassium fluoride is difficult and the fluoride is relatively expensive. Moreover, the highly hygroscopic nature of the fluoride renders its handling very troublesome. Similarly, the corrosion of the manufacturing apparatus is considerable and the compacted form of the solid residue makes its removal from the reactor a difficult matter.

The employment of potassium carbonate is interesting from the point of view of cost, but its use is accompanied by the risk of explosion during the reaction because of the formation of potassium carbonyl or carbide.

The present invention has therefore for its object an economic process of preparing potassium metal by a thermochemical procedure which does not have the aforesaid inconveniences.

The present invention relates to a process of preparing potassium by reduction at an elevated temperature of a derivative of potassium with silicon and it is characterized by this that the potassium derivative employed as the parent material is potassium hydroxide or potassium carbonate, and the reaction mixture includes a quantity of silica at least equal to that quantity necessary for transforming potassium hydroxide or potassium carbonate into a potassium silicate, and in addition, a sufficient quantity of lime, at least sufficient to neutralize the silica present and formed during the reaction, said reaction being effected in an inert atmosphere and preferably under a sweep of the atmosphere of the reactor with a relatively mild current of an inert gas.

The presence of silica at the commencement of the reaction is important because it prevents the formation of poisonous or dangerous byproducts such as $(KCO)_6$, or KH by reason of the reaction of said silica with the parent potassium compound at a temperature below the temperature at which the reduction is effected with the silicon.

The reduction of potassium hydroxide with silicon proceeds in accordance with this equation:

$$4KOH + 2Si + 4CaO = 4K + 2[SiO_2, CaO] + H_2$$

and hydrogen is thus formed which leads to the formation of potassium hydride which is to be avoided.

When use is made of potassium carbonate under similar conditions (see section (c) above), carbon monoxide is formed which leads to the formation of metal carbonyl ($KCO)_6$, which is unstable and explosive compounds.

On the other hand, and in accordance with this invention, if the heating of the parent materials is effected in the presence of silica, a preliminary reaction occurs at a temperature of below 900° C. which involves the transformation of the potassium compound in the parent material into potassium silicate; such a reaction can be written for example where one uses potassium hydroxide as follows: $2KOH + SiO_2 = K_2SiO_3 + H_2$ The water evaporates immediately, so that there is no possibility of the formation of potassium hydride in the reactor or during the balance of the reaction.

The quantity of silica added to the reaction mixture should be sufficient to assure the transformation of the parent potassium compound into a potassium silicate.

The experimental conditions which have influence on the chemical reaction between the various parent materials are:
1. the temperature of the reaction,
2. the proportion of silicon,
3. the proportion of lime,
4. the water content and
5. the atmosphere in which the reaction is conducted.

The temperature of the reaction is at least 1000° C. and preferably from 1100° to 1200° C. At a temperature of 1000° C. the speed of the reaction is low; after 1 hour the yield has progressed only 50 percent, but by operating at a temperature of above 1100° C, the yield exceeds 90° percent in less than an hour.

This reduction temperature of the potassium derivative by silicon is known in itself in the present process, but at temperatures of below 900° C. a reaction initially occurs between the parent potassium compound and the silica, which leads to the formation of a potassium silicate, and it is this compound which is reduced by the silicon at above 1000° C.

The reduction of the potassium hydroxide or potassium carbonate by the stoichiometric quantity of silicon is sufficient to give a yield of about 90 percent. An excess of silicon of up to 50 percent by weight effects but a slight rise in the yield.

A deficiency in silicon causes the yield to drop. Thus, when the quantity of silicon used is only two-thirds of the stoichiometric proportion, the yield is less than 70 percent.

The quantity of lime needed is approximately at least equal to the stoichiometric quantity needed to neutralize all of the silica formed from the silicon and the silica added at the commencement of the reaction. A deficiency in lime leads to a significant reduction in yield. Thus a deficiency of 25 percent with respect to the stoichiometric amount, leads to a yield limited to about 85 percent.

If the materials initially employed are not completely dry, it may be necessary to take into account the water present in the reaction media and to increase the quantities of reactants to take this into account.

EXAMPLE 1.

Introduce into a grinder mixer simultaneously:
- 7.7 grams of dried Kieselguhr, having a specific surface area of more than 200 square meters per gram,
- 14.3 grams of anhydrous potassium hydroxide in fragments,
- 5.4 grams of silicon powder of a degree of purity of more than 98 percent,
- 28.7 grams of powdered lime, whose purity is greater than 95 percent.

After grinding, the mixture obtained in the form of a fine powder is transferred into a refractory stainless steel boat. This boat is then placed in the reactor, which is formed of refractory nonoxidizable steel. The atmosphere in this reactor is then swept out and maintained under a current of some liters per hour (about 5 liters) of an inert gas (argon or nitrogen), The contents of the reactor are heated for three-quarters of an hour to a temperature of above 1100° C. and preferably of between 1200° C.

The potassium formed is recovered in the liquid state under petroleum oil or paraffin to protect it from the air.

After three-quarters of an hour's reaction time, 9.7 grams of potassium are thus obtained and this represents a yield of 97.0 percent.

In this example the ratio of KOH to $SiO_2$ is 2, which corresponds to the formation of potassium metasilicate.

The quantity of silicon employed is in excess of the stoichiometric proportion.

EXAMPLE 2

The process described in Example is repeated but with the following mixture:
- 15.4 grams of dry Fontainebleau sand having a specific surface area of the order of 0.5 square meters per gram,
- 14.4 grams of pure anhydrous potassium hydroxide granules,
- 7.2 grams of powdered silicon of a purity of more than 98 percent,
- 43.1 grams of finely divided lime whose purity is more than 95 percent; the ratio of KOH to $SiO_2$ being equal to 1, that is an excess of silica with respect to the potassium hydroxide corresponding with the formation of potassium metasilicate.

After an hour of reaction, 9.7 grams of potassium are thus obtained and this represents a yield of 97 percent.

EXAMPLE 3

The procedure described in Example 1 is followed but with the following mixture:
- 7.7 grams of dry Kieselguhr whose specific surface area is more than 200 square meters per gram,
- 14.4 grams of pure anhydrous potassium hydroxide grains,
- 5.4 grams of silicon powder of a purity of more than 98 percent,
- 14.4 grams of lime in grains whose purity is greater than 95 percent.

In this example there is used a deficiency of lime with respect to the stoichiometric quantity.

After an hour of reaction, 6 grams of potassium are thus obtained and this represents a yield of only 60 percent.

EXAMPLE 4

This example is designed to show that the absence of continuous sweeping with an inert gas is detrimental to the reaction.

Into a grinder mixer the following are introduced simultaneously:
- 7.7 grams of Kieselguhr having a specific surface are of more than 200 square meters per gram,
- 14.3 grams of pure anhydrous potassium hydroxide,
- 5.4 grams of silicon powder of a purity of more than 98 percent,
- 28.7 grams of lime grains whose purity is greater than 98 percent.

After grinding the mixture obtained into the form of a fine powder, it is conveyed in a boat formed of refractory stainless steel. This boat is then lodged in a refractory stainless steel reactor. No purge of the atmosphere of the reactor during the operation is effected. The contents of the reactor are raised in three quarters of an hour to a temperature of between 1100° and 1200° C.

The potassium formed is recovered as a liquid in the absence of air under petroleum oil or paraffin.

After an hour's reaction time, 4.4 grams of potassium are thus recovered and this represents a yield of only 44 percent.

EXAMPLE 5

In a grinder mixture the following are introduced simultaneously:
- 17.6 grams of dry potassium carbonate,
- 7.6 grams of silica (Kieselguhr or sand)
- 2.6 grams of silicon powder of a purity of more than 98 percent,
- 25 grams of lime in kernels whose purity is greater than 95 percent.

After grinding the mixture obtained in the form of a fine powder is transferred into a stainless steel refractory boat.

This boat is then lodged in a stainless steel refractory reactor. The atmosphere is this reactor is maintained under a current of some liters per hour of inert gas such as argon or nitrogen.

The contents of the reactor are then carried to a temperature of about 1100° C. and the potassium formed is recovered as a liquid in the absence of air under paraffin oil.

In one hour 9.5 grams of pure potassium are recovered and this represents a yield of 95 percent.

1. The process of preparing metallic potassium which comprises heating, to at least 1100° C., in an inert atmosphere, a finely divided anhydrous mixture of silicon, lime, silica and a member of the group consisting of potassium hydroxide and potassium carbonate, the amount of silica being at least equal to the theoretical amount required for the conversion of the initial potassium compound into a potassium silicate, the amount of lime being at least equal to the theoretical quantity required to neutralize all the silica added and formed in the course of the reaction, and the amount of silicon being at least equal to the stoichiometric quantity needed for complete reduction of the potassium compound into metallic potassium, distilling off the resulting metallic potassium and then recovering it.

2. The process of claim 1, wherein the inert atmosphere used is provided by gas selected from the group consisting of argon and nitrogen.

3. The process of preparing metallic potassium according to claim 1, in which the initial mixture of silicon, lime, silica and potassium compound is initially heated to a temperature of below 900° C. whereby the parent potassium compound and the silica react to form potassium silicate and then heating the resulting mixture containing said potassium silicate and silicon to a temperature of from 1100° C. to 1200° C. whereby said potassium silicate is reduced into metallic potassium.